US010038759B2

(12) United States Patent
Lee et al.

(10) Patent No.: US 10,038,759 B2
(45) Date of Patent: Jul. 31, 2018

(54) METHOD, MANAGEMENT SERVER, AND COMPUTER-READABLE STORAGE MEDIUM FOR SUPPORTING PROVISION OF SERVICE DESIRED BY CLIENT TERMINAL BY ADAPTIVELY MODIFYING NETWORK TOPOLOGY DEPENDING ON PROPERTIES OF SERVICE

(71) Applicant: Center of Human-Centered Interaction for Coexistence, Seoul (KR)

(72) Inventors: Joong Jae Lee, Seoul (KR); Eun Mi Lee, Seoul (KR); Sang Hun Nam, Seoul (KR); Bum Jae You, Seoul (KR)

(73) Assignee: CENTER OF HUMAN-CENTERED INTERACTION FOR COEXISTENCE (KR)

( * ) Notice: Subject to any disclaimer, the term of this patent is extended or adjusted under 35 U.S.C. 154(b) by 174 days.

(21) Appl. No.: 15/210,132

(22) Filed: Jul. 14, 2016

(65) Prior Publication Data

US 2017/0026490 A1 Jan. 26, 2017

(30) Foreign Application Priority Data

Jul. 22, 2015 (KR) ........................ 10-2015-0103821

(51) Int. Cl.
*H04L 29/08* (2006.01)
*H04L 12/24* (2006.01)

(52) U.S. Cl.
CPC ........ *H04L 67/327* (2013.01); *H04L 41/0816* (2013.01); *H04L 67/104* (2013.01); *H04L 67/16* (2013.01); *H04L 67/34* (2013.01)

(58) Field of Classification Search
CPC .. H04L 67/327; H04L 67/104; H04L 41/0816
See application file for complete search history.

(56) References Cited

U.S. PATENT DOCUMENTS 8,015,281 B2 * 9/2011 Baker ..................... H04L 47/10
370/232
8,041,823 B2 * 10/2011 Qiu ......................... H04L 12/66
709/217

(Continued)

*Primary Examiner* — Jimmy H Tran
(74) *Attorney, Agent, or Firm* — Mendelsohn Dunleavy, P.C.

(57) ABSTRACT

In accordance with an aspect, there is provided a method for supporting provision of service so that a client terminal is provided with desired service by adaptively modifying a network topology depending on service properties, including (a) when service type information indicating a type of desired service is acquired from the client terminal, and status information indicating status of one or more service provision servers is acquired, acquiring, by a management server, network configuration information as information corresponding to the service type information and the status information with reference to a DB, wherein the network configuration information is required by the client terminal to be provided with the service from a specific service provision server; and (b) transmitting, by the management server, acquired network configuration information to the client terminal, thus supporting network configuration such that the client terminal configures a network based on the network configuration information.

13 Claims, 9 Drawing Sheets

(56) References Cited

U.S. PATENT DOCUMENTS

| | | | | |
|---|---|---|---|---|
| 8,230,091 B2* | 7/2012 | Kliland | H04L 63/029 | 709/227 |
| 8,468,267 B2* | 6/2013 | Yigang | H04L 45/306 | 709/219 |
| 8,566,450 B2* | 10/2013 | Narayana | H04L 67/1027 | 370/466 |
| 8,838,830 B2* | 9/2014 | Igelka | G06F 9/5083 | 370/255 |
| 9,172,753 B1* | 10/2015 | Jiang | H04L 67/1097 | |
| 9,247,436 B2* | 1/2016 | Moore | H04W 24/02 | |
| 9,305,086 B2* | 4/2016 | Amine | H04N 21/2665 | |
| 9,466,278 B2* | 10/2016 | Rosedale | G10H 5/02 | |
| 9,491,498 B2* | 11/2016 | Brooks | H04N 21/23439 | |
| 9,860,768 B2* | 1/2018 | Goerke | H04W 24/02 | |
| 2003/0101278 A1* | 5/2003 | Garcia-Luna-Aceves | G06F 12/1483 | 709/240 |
| 2006/0227705 A1* | 10/2006 | Chandwadkar | H04L 47/10 | 370/229 |
| 2009/0265458 A1* | 10/2009 | Baker | H04L 47/10 | 709/224 |
| 2010/0011115 A1* | 1/2010 | Kliland | H04L 63/029 | 709/230 |
| 2010/0122175 A1* | 5/2010 | Gupta | H04L 41/0893 | 715/735 |
| 2010/0131639 A1* | 5/2010 | Narayana | H04L 67/1027 | 709/224 |
| 2010/0161806 A1* | 6/2010 | Qiu | H04L 12/66 | 709/227 |
| 2010/0299451 A1* | 11/2010 | Yigang | H04L 45/306 | 709/241 |
| 2012/0089664 A1* | 4/2012 | Igelka | G06F 9/5083 | 709/203 |
| 2012/0272285 A1* | 10/2012 | Brooks | H04N 21/23439 | 725/146 |
| 2013/0046876 A1* | 2/2013 | Narayana | H04L 67/1027 | 709/223 |
| 2014/0031006 A1* | 1/2014 | Moore | H04W 24/02 | 455/405 |
| 2015/0325226 A1* | 11/2015 | Rosedale | G10H 5/02 | 381/119 |
| 2016/0085594 A1* | 3/2016 | Wang | H04L 67/18 | 709/226 |
| 2016/0323758 A1* | 11/2016 | Goerke | H04W 24/02 | |

* cited by examiner

| Channel | Data Type | FPS | Size | |
|---|---|---|---|---|
| EXCLUSIVE CHANNEL 1 | Video | 30 | 600000byte | FullHD + Depth |
| EXCLUSIVE CHANNEL 2 | Audio | 45 | 4096byte | Sound |
| SHARED CHANNEL 1 | Haptic(VIBRATING RING) | 100 | 100byte | Position |
| | Haptic(MoCAP) | 100 | 100byte | Position, angle |

METHOD, MANAGEMENT SERVER, AND COMPUTER-READABLE STORAGE MEDIUM FOR SUPPORTING PROVISION OF SERVICE DESIRED BY CLIENT TERMINAL BY ADAPTIVELY MODIFYING NETWORK TOPOLOGY DEPENDING ON PROPERTIES OF SERVICE

BACKGROUND OF THE INVENTION

1. Field of the Invention

The present invention generally relates to a method, a management server, and a computer-readable storage medium for supporting the provision of a service desired by a client terminal by adaptively modifying a network topology depending on the properties of the desired service. More particularly, the present invention relates to a method, a management server, and a computer-readable storage medium that are configured such that, if service type information, indicating the type of service desired to be received by a client terminal, is acquired from the client terminal, and status information, indicating the status of one or more service provision servers, is acquired from the one or more service provision servers, a process for acquiring, with reference to a database, network configuration information required by the client terminal to be provided with a service from a specific service provision server, among the one or more service provision servers, as information corresponding to the service type information and the status information, and a process for supporting network configuration such that the client terminal configures a network based on the network configuration information, by transmitting the acquired network configuration information to the client terminal, are performed.

2. Description of the Related Art

Various types of technologies enabling data to be transmitted/received between remote users over a network have been developed. In particular, as three-dimensional (3D) virtual reality rendering technology has recently been developed, a need for technology that enables realistic data to be exchanged between remote users has increased. Such technology is expected to be utilized in various fields, such as military affairs, medical treatment, industrial design, and game fields.

Generally, realistic data may be composed of various types of data, such as image (or video) data, audio data, and haptic data, and may require physical server resources to process a virtual reality screen or require streaming service resources to transmit/receive video data. In this way, an environment for realistic data transmission/reception is more complicated in the aspect of data configuration and service properties than a typical data transmission/reception environment.

Therefore, when a conventional fixed network topology is used, a problem arises in that efficiency is deteriorated in a realistic data exchange environment in which the transmission/reception of various types of data is performed in various forms.

For example, a service in which low-capacity messages are exchanged in a 1:1 manner between a plurality of users may be managed by a P2P server (e.g. Napster service). When screen rendering indicating a virtual space is required in the realistic data exchange environment, a P2P server for sending low-capacity messages may be unsuitable for the processing of large-capacity data required for screen rendering.

Therefore, it can be seen that, in order for a plurality of users to transmit/receive and process various types of realistic data in real time therebetween, a more flexible network topology is required.

Therefore, the present applicant has devised technology capable of adaptively modifying a network topology depending on the properties of a service desired to be received by a client terminal in a realistic data transmission/reception environment, and then rapidly and efficiently transmitting/receiving realistic data.

SUMMARY OF THE INVENTION

An object of the present invention is to solve all of the above-described problems.

Another object of the present invention is to rapidly and efficiently transmit/receive realistic data by adaptively modifying a network topology depending on the properties of a service desired to be received by a client terminal in a realistic data transmission/reception environment.

A further object of the present invention is to efficiently transmit/receive realistic data by adaptively configuring the network of a client terminal depending on the type of service desired to be received by the client terminal and the status of a service provision server.

Yet another object of the present invention is to set up a network channel of a client terminal by additionally considering the type of data that is transmitted/received by the client terminal and the characteristics of an opposite terminal, thus efficiently transmitting/receiving realistic data.

The representative configuration of the present invention to accomplish the above objects is given as follows.

In accordance with an aspect of the present invention, there is provided a method for supporting provision of a service so that a client terminal is provided with a desired service by adaptively modifying a network topology depending on properties of a service desired to be received by the client terminal, the method including (a) when service type information indicating a type of service desired to be received by the client terminal is acquired from the client terminal, and status information indicating status of one or more service provision servers is acquired from the one or more service provision servers, acquiring, by a management server, network configuration information as information corresponding to both the service type information and the status information with reference to a database (DB), wherein the network configuration information is required by the client terminal to be provided with the service from a specific service provision server, among the one or more service provision servers; and (b) transmitting, by the management server, the acquired network configuration information to the client terminal, thus supporting network configuration such that the client terminal configures a network based on the network configuration information.

In accordance with another aspect of the present invention, there is provided a management server for supporting provision of a service so that a client terminal is provided with a desired service by adaptively modifying a network topology depending on properties of a service desired to be received by the client terminal, the management server including a network configuration information acquisition unit for, when service type information indicating a type of service desired to be received by the client terminal is acquired from the client terminal and status information indicating status of one or more service provision servers is acquired from the one or more service provision servers, acquiring network configuration information as information corresponding to both the service type information and the status information with reference to a database (DB), wherein the network configuration information is required by the client terminal to be provided with the service from a specific service provision server, among the one or more service provision servers; and a communication unit for transmitting the acquired network configuration information to the client terminal, thus supporting network configuration such that the client terminal configures a network based on the network configuration information.

In addition, there are further provided other methods and apparatuses for implementing the present invention, and a computer-readable storage medium for storing a computer program for executing the methods.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
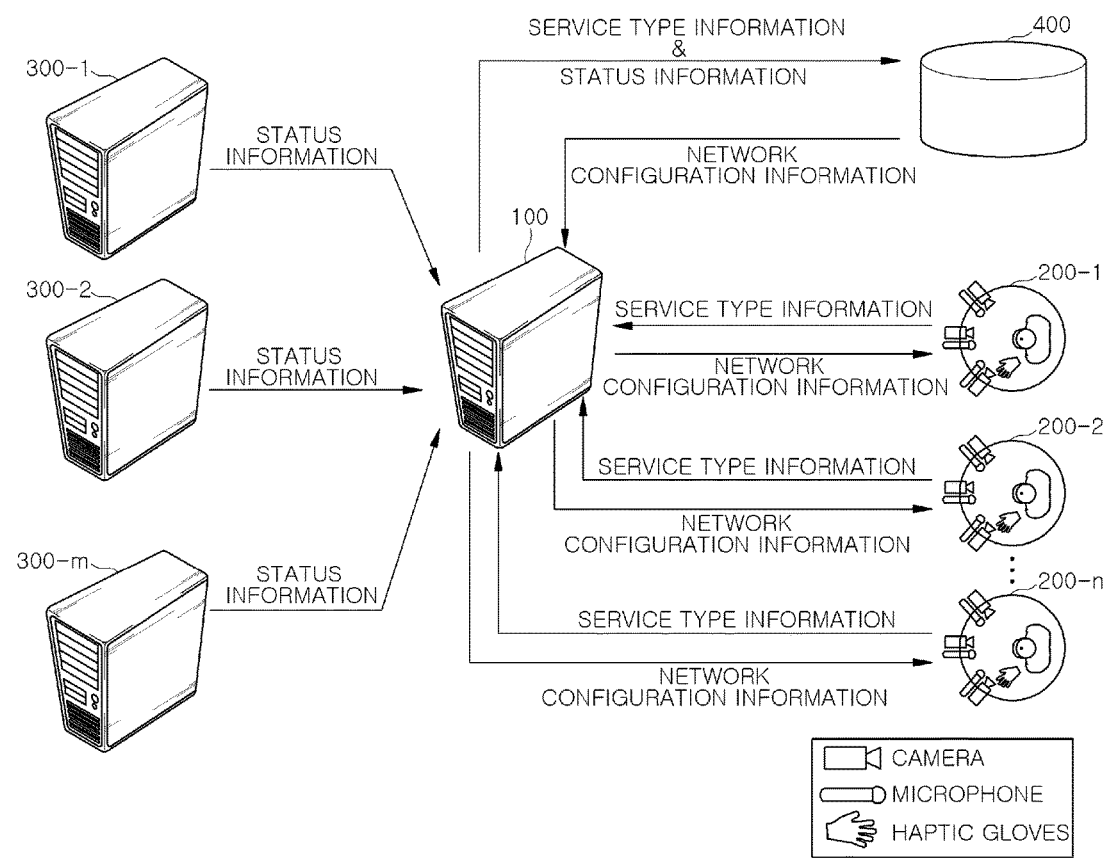
FIG. 1 is a conceptual diagram showing the operation of a management server for adaptively modifying a network topology depending on the properties of a service desired to be received by a client terminal according to an embodiment of the present invention.

The following detailed description of the present invention will be made with reference to the attached drawings illustrating specific embodiments in which the present invention may be practiced. These embodiments are described so that those having ordinary knowledge in the technical field to which the present invention pertains can easily practice the present invention. It should be understood that various embodiments are different from each other, but do not need to be mutually exclusive to each other. For example, specific shapes, structures, and characteristics described here may be implemented in other embodiments without departing from the spirit and scope of the present invention in relation to an embodiment. Further, it should be understood that the locations or arrangement of individual components in each disclosed embodiment can be changed without departing from the spirit and scope of the present invention. Therefore, the accompanying detailed description is not intended to limit the present invention, and the scope of the present invention is limited only by the accompanying claims, along with equivalents thereof, as long as it is appropriately described. In the drawings, similar reference numerals are used to designate the same or similar functions in various aspects.

FIG. 1 is a conceptual diagram showing the operation of a management server for adaptively modifying a network topology depending on the properties of a service desired to be received by a client terminal according to an embodiment of the present invention.

Referring to FIG. 1, a management server 100 may adaptively modify a network topology depending on the properties of a service desired to be received by each of one or more client terminals 200-1, 200-2, . . . , 200-$n$ from one or more service provision servers 300-1, 300-2, . . . , 300-$m$. Further, the management server 100 may provide the modified network topology information to the one or more client terminals 200-1, 200-2, . . . , 200-$n$, thus supporting the provision of the service so that each of the one or more client terminals 200-1, 200-2, . . . , 200-$n$ may configure a network depending on the properties of the desired service.

More specifically, the management server 100 may acquire so-called service type information, indicating the type of service desired to be received by each client terminal, from each of the client terminals 200-1, 200-2, . . . , 200-$n$. Here, the service type information may include information indicating a streaming service, a 1:1 communication service (private communication service), a data processing service (centralized processing service), etc. Streaming service is a service by which at least a part of video data and audio data is transmitted/received to be streamed in real time. The streaming service may be performed between a plurality of users (client terminals) through a relay server. The 1:1 communication service is a service for supporting 1:1 communication between a plurality of users. Here, the sending/receiving of text messages may be mainly performed, but the sending/reception of audio data or video data may also be performed. The data processing service is a service by which, when a request from a specific client terminal is received, data may be calculated and the results of calculation are returned. Here, the calculation of data may be performed via a physical engine. In this case, the physical engine is not limited to middleware for simulating computer graphics or virtual reality, but may be any of various types of devices including a processor for performing calculation related to realistic data and applications.

Meanwhile, the acquisition of service type information may be performed via a service provision request received from a specific client terminal. That is, the specific client terminal may transmit the service type information while requesting the management server 100 to provide a service.

Further, the management server 100 may acquire status information indicating the status of the one or more service provision servers 300-1, 300-2, . . . , 300-$m$ from the one or more service provision servers 300-1, 300-2, . . . 300-$m$. The status information means information about status related to the one or more service provision servers 300-1, 300-2, . . . , 300-$m$ or related to client terminals that access the one or more service provision servers 300-1, 300-2, . . . , 300-$m$. For example, the status information may be at least some of information about the number of service provision servers 300-1, 300-2, . . . , 300-$m$ that currently provide a service, information about the number of users (the number of client terminals) who are currently provided with a service from the one or more service provision servers 300-1, 300-2, . . . , 300-*m*, and information about the number of channels through which a service is currently provided. Further, the status information may include fundamental information about the one or more service provision servers 300-1, 300-2, . . . , 300-*m*. For example, the status information may include the identifier of a specific service provision server, the type information of service provided by each server, bandwidth information, etc.

Furthermore, the management server 100 may acquire, as information corresponding to both the service type information and the status information, network configuration information required by each client terminal to be provided with a service from a specific service provision server, among the one or more service provision servers 300-1, 300-2, . . . , 300-*m*, with reference to a database (DB) 400.

For example, the management server 100 may acquire a streaming service (an example of service type information) from the specific client terminal, and may acquire information about the number of users (an example of status information) who are currently provided with the streaming service from the one or more service provision servers 300-1, 300-2, . . . , 300-*m*. In this case, the management server 100 may acquire network configuration information required by the specific client terminal to be provided with the service from a specific media server, for which the number of users is less than a predetermined number, by searching the DB 400 using the acquired information as key values.

The management server 100 may transmit the acquired network configuration information to the specific client terminal, thus supporting network configuration so that the specific client terminal performs network configuration based on the network configuration information. Here, the network configuration information may be information obtained by calculating parameters so that the specific client terminal may automatically configure a channel. For example, the network configuration information may include the port information and IP address information of a specific server.

Meanwhile, the management server 100 may perform a typical naming service function. That is, the management server 100 may store and manage the name and address of each server, and the name, password, and access permission information of each client terminal.

Hereinafter, the configuration and operation of the management server 100 according to an embodiment of the present invention will be described in greater detail.

Figure 2:
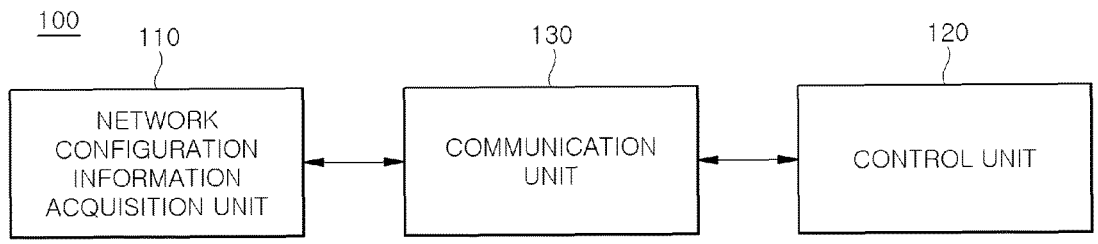
FIG. 2 is a block diagram showing the configuration of the management server according to an embodiment of the present invention.

FIG. 2 is a block diagram showing the configuration of the management server according to an embodiment of the present invention.

Referring to FIG. 2, the management server 100 according to the embodiment of the present invention may include a network configuration information acquisition unit 110, a communication unit 120, and a control unit 130.

When service type information, indicating the type of service desired to be received by a specific client terminal, is acquired from the specific client terminal, and status information, indicating the status of one or more service provision servers 300-1, 300-2, . . . , 300-*m*, is acquired from the one or more service provision servers 300-1, 300-2, . . . , 300-*m*, the network configuration information acquisition unit 110 may acquire network configuration information, as the information corresponding to both the service type information and the status information, with reference to the DB 400, wherein the network configuration information is required by the specific client terminal to be provided with the service from a specific service provision server, among the one or more service provision servers 300-1, 300-2, . . . , 300-*m*.

More specifically, when service type information is acquired from the specific client terminal, and first status information, indicating the status of the one or more service provision servers 300-1, 300-2, . . . , 300-*m*, is acquired from the one or more service provision servers 300-1, 300-2, . . . , 300-*m*, the network configuration information acquisition unit 110 may acquire network topology information corresponding to both the service type information and the first status information, with reference to the DB 400.

Further, the network configuration information acquisition unit 110 may determine network parameter information required by the specific client terminal to be provided with a service from a specific service provision server, among the one or more service provision servers 300-1, 300-2, . . . , 300-*m*, based on the acquired network topology information and second status information, indicating the status of the one or more service provision servers 300-1, 300-2, . . . , 300-*m*.

That is, the network configuration information acquisition unit 110 acquires network topology information from the DB 400 by using the acquired service type information and the first status information as key values, and may determine network parameter information based on the acquired network topology information and the second status information. Alternatively, the network parameter information may be determined without performing a DB search procedure.

Here, the first status information and the second status information may be at least some of information about the number of service provision servers 300-1, 300-2, . . . , 300-*m* that currently provide a service, information about the number of users who are currently provided with a service from the one or more service provision servers 300-1, 300-2, . . . , 300-*m*, and information about the number of channels through which a service is currently provided. Further, the first status information may also include fundamental information about the one or more service provision servers 300-1, 300-2, . . . , 300-*m*.

For example, the management server 100 may acquire streaming service information as service type information from a specific client terminal, and may acquire fundamental information about the one or more service provision servers 300-1, 300-2, . . . , 300-*m* that are currently operated, as the first status information, from the one or more service provision servers 300-1, 300-2, . . . , 300-*m*. In this case, the management server 100 may search the DB 400 using the acquired information as key values, and may then acquire network topology information required to be provided with a streaming service through a relay server that is currently operated. Further, the management server 100 may acquire information about the number of users who are currently provided with a service, as the second status information. In this case, the management server 100 may determine network parameters so that the service is provided from a relay server for which the number of users is relatively small.

However, unlike the above case, the network configuration information acquisition unit 110 may acquire both the network topology information and the network parameter information with reference to the DB 400. That is, when the service type information, indicating the type of service desired to be received by the specific client terminal, is acquired from the specific client terminal, and status information, indicating the status of the one or more service provision servers 300-1, 300-2, . . . , 300-*m*, is acquired from the one or more service provision servers 300-1, 300-2, . . .

300-*m*, the network configuration information acquisition unit 110 may acquire (i) network topology information and (ii) network parameter information, which correspond to both the service type information and the status information, with reference to the DB 400.

In various embodiments of the present invention which will be described later, a description will be made on the assumption that network configuration information (network topology information and network parameter information) is acquired without distinguishing the above two cases, but it should be noted that the following embodiments may be applied to the above two cases.

Figure 3:
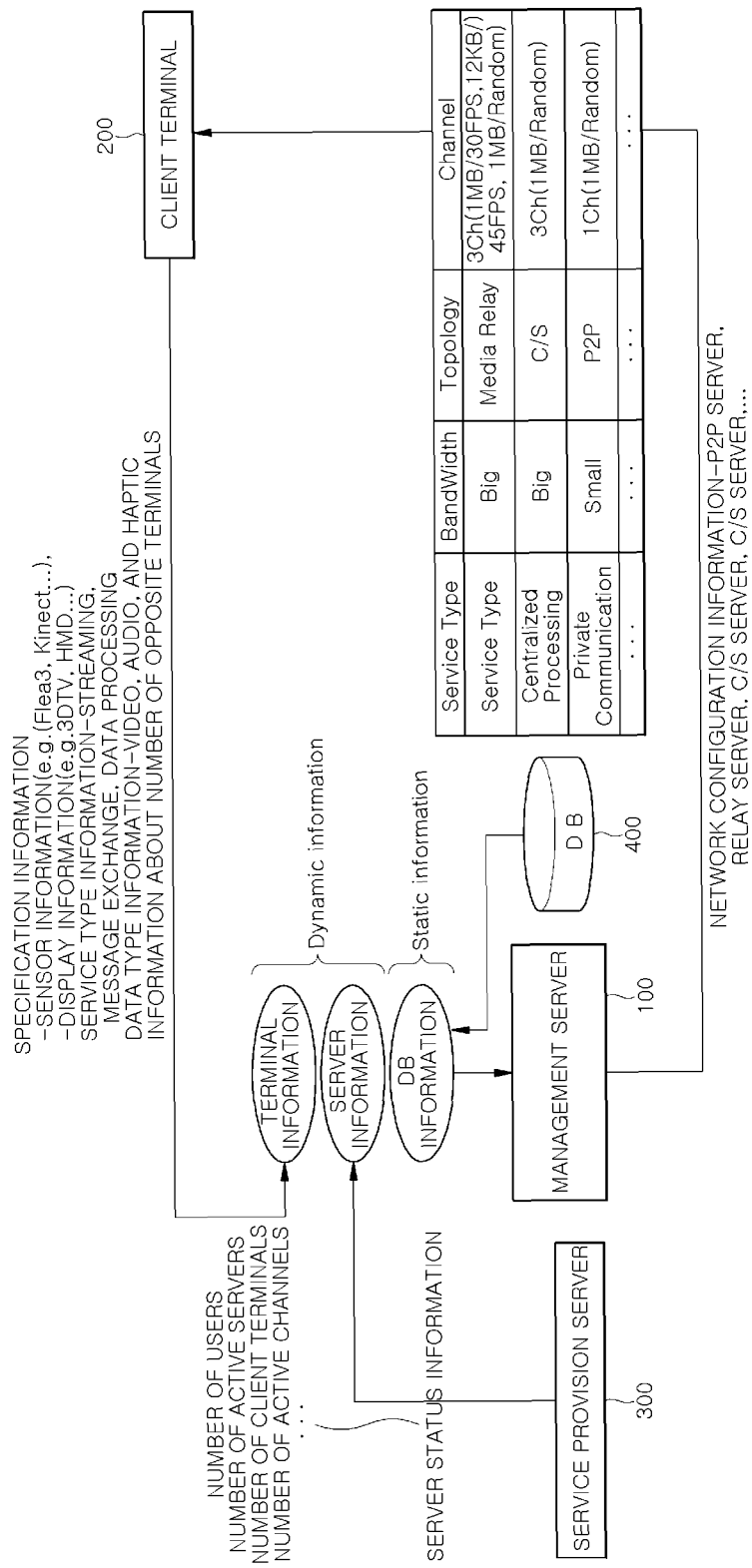
FIG. 3 is a reference diagram for describing in greater detail the operation of the management server according to an embodiment of the present invention.

FIG. 3 is a reference diagram showing in greater detail the operation of the management server according to an embodiment of the present invention.

Referring to FIG. 3, it can be seen that the management server 100 may acquire information about the number of users who are currently provided with a service from one or more service provision servers 300-1, 300-2, . . . , **300-*m*. When the number of users who are currently provided with a service from a specific service provision server reaches a maximum value, and a specific client terminal needs to be provided with a service from the specific service provision server, the management server 100 may allocate a new service provision server that provides a similar service to the specific client terminal. That is, when the acquired status information includes information about the number of users who are currently provided with a specific service from the specific service provision server, and the number of users is identical to the maximum number of users of the specific service provision server that provides the specific service, the network configuration information acquisition unit 110 of the management server 100 may acquire network configuration information required by the specific client terminal to be provided with the specific service from a new service provision server. In this case, the management server 100 may activate a new server and increase the number of servers that provide the similar service. In contrast, when the number of users who are currently provided with the service from the specific service provision server becomes 0, the management server 100** may deactivate the specific service provision server.

Further, the management server 100 may additionally acquire at least one of information about the type of transmission/reception data, which is transmitted/received when a specific client terminal is provided with a service, and information about the number of opposite terminals that transmit/receive data to/from the specific client terminal, from the specific client terminal. Since the information acquired in this way from the specific client terminal varies depending on the client terminals, it may be referred to as "dynamic information". In contrast, information acquired from the DB 400 may be referred to as "static information". The data type information may include video data, audio data, Motion Capture (MoCAP) haptic data, vibrating ring haptic data, etc. The number of channels through which data is transmitted/received may vary depending on the type of data. For example, since the size of video data or audio data is large, it is efficient to transmit or receive the video or audio data through an independent channel. In contrast, since the size of haptic data is small, there is no need to essentially allocate a single exclusive channel to a single piece of data. Similarly, the number of channels through which data is transmitted/received may vary depending on the number of opposite terminals that transmit/receive data. That is, when the number of opposite terminals is one, two channels are required if channels for transmission and reception are separately provided. Further, when the number of opposite terminals is two, three channels may be required so as to provide a single channel for transmission and two channels for reception. Therefore, the network configuration information acquisition unit 110 may acquire information about the number of data transmission/reception channels, which corresponds to at least one of the acquired data type information and information about the number of opposite terminals, as the network configuration information.

In addition, the management server 100 may manage a server resource pool composed of service provision servers and may monitor information about servers that are currently operated and information about the status of client terminals that access the corresponding server.

Referring back to FIG. 2, the communication unit 120 is a component for communicating with the one or more client terminals 200-1, 200-2, . . . , **200-*n* and the one or more service provision servers 300-1, 300-2, . . . , 300-*m*. More specifically, the communication unit 120 receives service type information from each of the one or more client terminals 200-1, 200-2, . . . , 200-*n*, and status information from each of the one or more service provision servers 300-1, 300-2, . . . , 300-*m*. Further, the communication unit 120 may also receive a service request from each of the one or more client terminals 200-1, 200-2, . . . , 200-*n*. The communication unit 120** may acquire network configuration information, and transmit the network configuration information to the specific client terminal, thus supporting network configuration so that the specific client terminal performs network configuration based on the network configuration information.

Below, network configuration information determined differently depending on the service type information will be described. Of course, when network configuration information is determined, the status information of service provision servers may be additionally considered.

Figure 4:
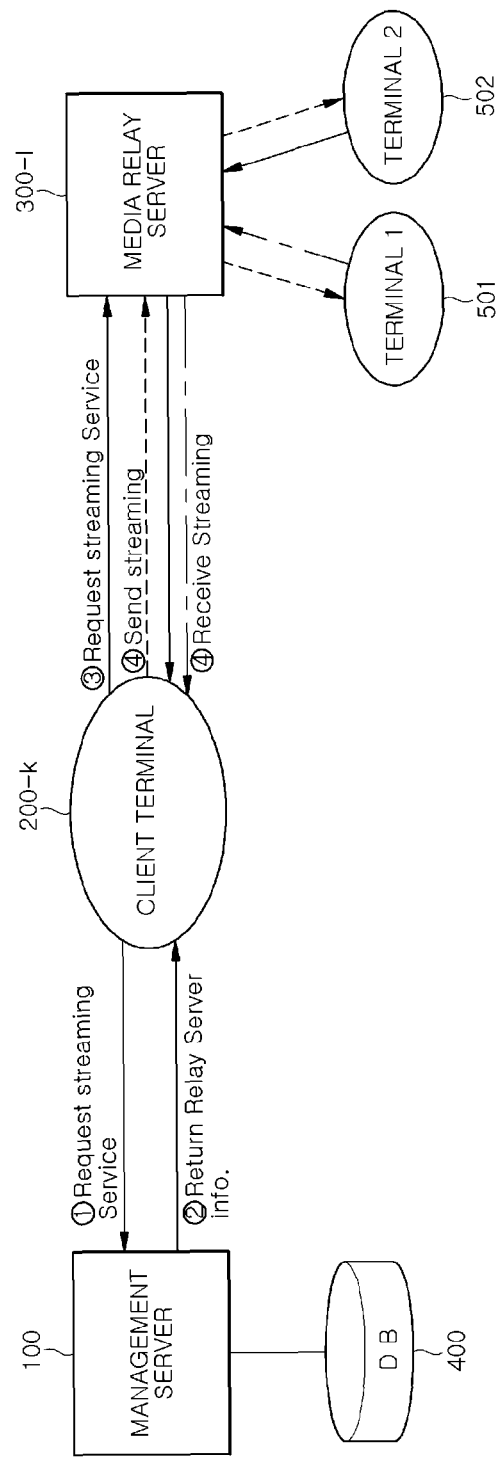
FIG. 4 is a diagram showing a network topology when service type information indicates a streaming service.

FIG. 4 is a diagram showing a network topology when service type information indicates a streaming service.

Referring to FIG. 4, when service type information indicates a streaming service, the network configuration information acquisition unit 110 may acquire network configuration information required by a specific client terminal **200-*k*, which is one of the client terminals 200-1, 200-2, . . . , 200-*n*, to be provided with a streaming service through a specific relay server 300-1, which is one of the one or more service provision servers 300-1, 300-2, . . . , 300-*m*, with reference to the DB 400. Here, k may be an arbitrary integer ranging from 1 to n, and 1 may be an arbitrary integer ranging from 1 to m. First, when the specific client terminal 200-*k* requests the transmission/reception of realistic data streaming to/from other client terminals 501 and 502 from the management server 100 (①) of FIG. 4), the network configuration information acquisition unit 110 acquires network configuration information that allows the specific client terminal 200-*k* to be provided with the streaming service through the specific relay server 300-1, among the one or more service provision servers 300-1, 300-2, . . . , 300-*m*, with reference to the DB 400. The communication unit 120 may transmit network configuration information including information about the specific relay server 300-1 to the specific client terminal 200-*k* (②) of FIG. 4). The specific client terminal 200-*k* may perform data streaming with other client terminals 501 and 502 through the specific relay server 300-1 (③) and ④) of FIG. 4**).

Figure 5:
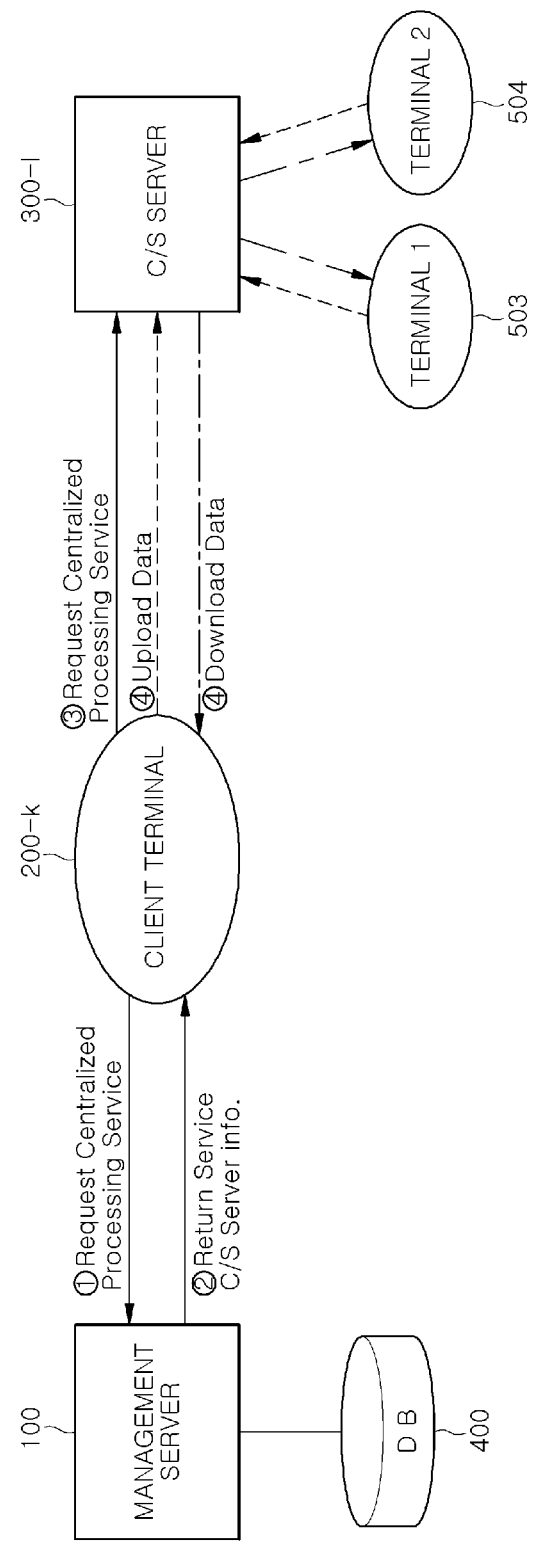
FIG. 5 is a diagram showing a network topology when the service type information indicates a data processing service.

FIG. 5 is a diagram showing a network topology when service type information indicates a data processing service.

Referring to FIG. 5, when the service type information indicates a data processing (centralized processing) service, the network configuration information acquisition unit 110 may acquire network configuration information required to be provided with the data processing service through a specific physical engine server 300-1, among the one or more service provision servers 300-1, 300-2, . . . , 300-m, with reference to the DB 400. The value of 1 in FIG. 5 is assumed to be different from the value of 1 in FIG. 4. The procedure in which the data processing service is provided will be described below. That is, when a specific client terminal 200-k requests the data processing service (①) of FIG. 5), the network configuration information acquisition unit 110 may acquire network configuration information required to be provided with the data processing service through the specific physical engine server 300-1, among the one or more service provision servers 300-1, 300-2, . . . , 300-m, with reference to the DB 400. The communication unit 120 may transmit the network configuration information including information about the specific physical engine server 300-1 to the specific client terminal 200-k (②) of FIG. 5). The specific client terminal 200-k may request the processing of data and receive the results of processing the data, through the specific physical engine server 300-1 (③) and ④) of FIG. 5).

Figure 6:
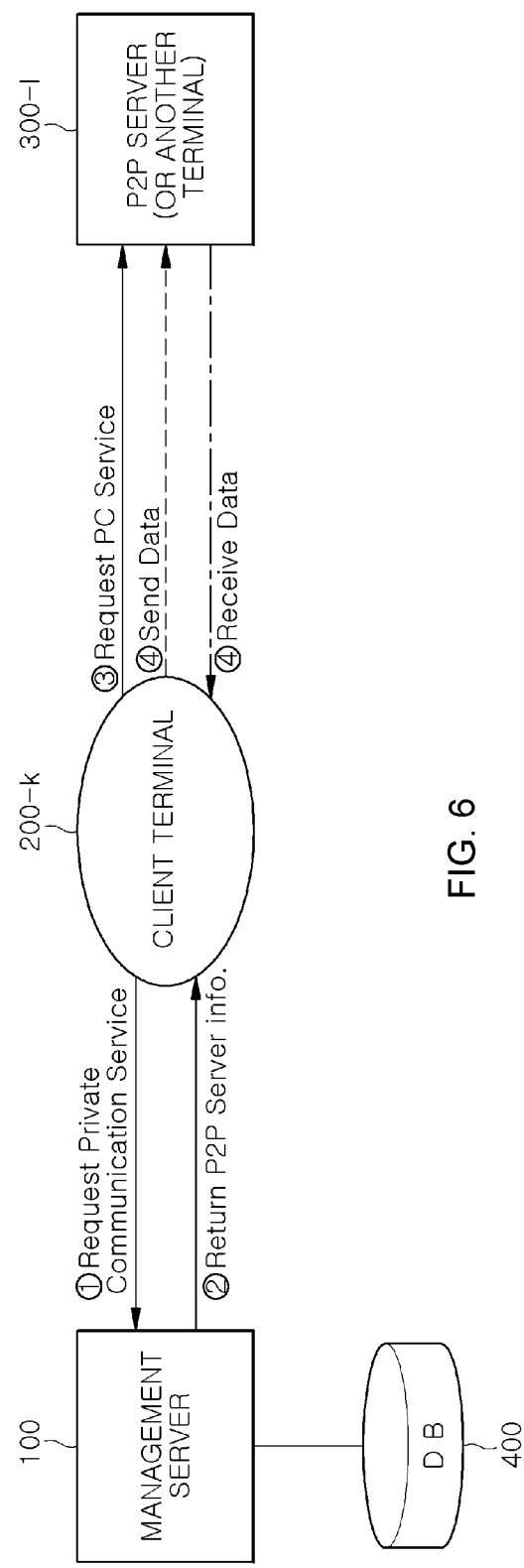
FIG. 6 is a diagram showing a network topology when the service type information indicates a 1:1 communication service.

FIG. 6 is a diagram showing a network topology when service type information indicates a 1:1 communication (private communication) service.

Referring to FIG. 6, when the service type information indicates the 1:1 communication service, the network configuration information acquisition unit 110 may acquire network configuration information required to be provided with the 1:1 communication service through a specific P2P server 300-1, among the one or more service provision servers 300-1, 300-2, . . . , 300-m, with reference to the DB 400. The value of 1 in FIG. 6 is assumed to be different from the values of 1 in FIGS. 4 and 5. When a specific client terminal 200-k requests the 1:1 communication service (①) of FIG. 6), the network configuration information acquisition unit 110 may acquire network configuration information required to be provided with the 1:1 communication service through the specific P2P server 300-1, among the one or more service provision servers 300-1, 300-2, . . . , 300-m, with reference to the DB 400. The communication unit 120 may transmit the network configuration information including information about the specific P2P server 300-1 to the specific client terminal 200-k (②) of FIG. 6). The specific client terminal 200-k may be provided with the 1:1 communication service through the specific P2P server 300-1 (③) and ④) of FIG. 6).

Referring back to FIG. 3, it can be seen that the network configuration information acquisition unit 110 may further acquire the specification information of a specific client terminal, in addition to the service type information thereof, from the specific client terminal. Since the specification information of the specific client terminal also varies depending on the client terminal, it is dynamic information. The specification information may include information about a sensor for sensing data transmitted by the specific client terminal, information about a camera or microphone used by the specific client terminal to capture video or record audio, information about the resolution of a display, etc. Since this information corresponds to the size of transmission/reception data, channels may be suitably allocated based on such information. For example, when a transmitting stage transmits Full High Definition (FHD)-level video, and a display in a receiving stage supports the play of only HD-level video, the transmitting stage does not need to transmit FHD-level video. The management server 100 may support network configuration not only by utilizing such information for configuring network information, but also by providing the information to the transmitting stage and then reducing the amount of data.

In addition, information about the transmission/reception period of data, information about the size of the transmission/reception data, information about the size of the maximum packet of the transmission/reception data, etc. may be acquired from the specific client terminal. That is, when at least some of the specification information of the specific client terminal, the transmission/reception period information of data, the size information of transmission/reception data, and the size information of the maximum packet of the transmission/reception data is further acquired as additional determination information from the specific client terminal, the network configuration information acquisition unit 110 may acquire network configuration information by additionally considering at least some of the specification information of the specific client terminal, the transmission/reception period information of data, the size information of the transmission/reception data, and the size information of the maximum packet of the transmission/reception data.

Here, when the size of the transmission/reception data is equal to or greater than a predetermined size, the network configuration information acquisition unit 110 may acquire network configuration information that is set such that the data is transmitted/received through an exclusive channel. Further, when the size of the transmission/reception data and the size of other pieces of transmission/reception data are less than the predetermined size, and the periods of the data are similar to each other, the network configuration information acquisition unit 110 may acquire the network configuration information that is set such that the transmission/reception data and other pieces of transmission/reception data are transmitted/received through a shared channel. Here, the term "period" denotes the number of transmissions of data per unit time on the network. In this way, the present invention may efficiently perform the transmission/reception of data by efficiently allocating network resources.

Figures 7, 8:
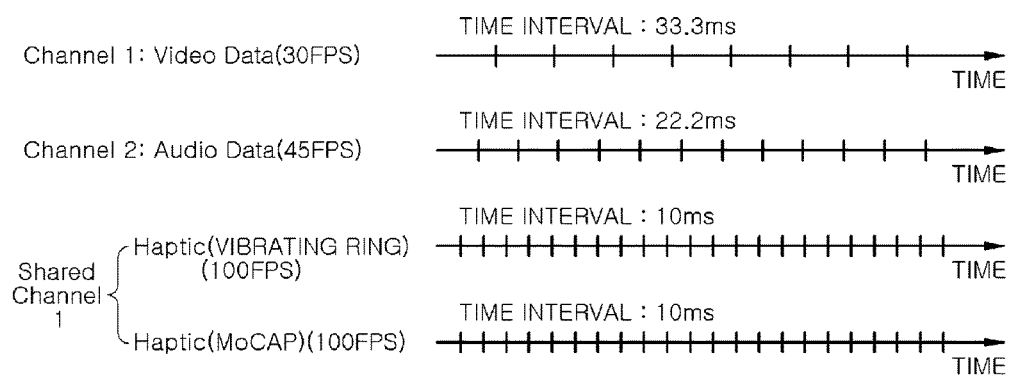
FIGS. 7 and 8 are diagrams showing examples of channel allocation depending on the size and period of data.

FIGS. 7 and 8 are diagrams showing examples of channel allocation depending on the size and period of data.

Referring to FIG. 7, channel 1 and channel 2 are allocated to video data and audio data, respectively, whereas a shared channel is allocated to two types of haptic data because the periods of the haptic data are equal to each other, for example, 100 FPS.

Further, referring to FIG. 8, an example of channel allocation depending on the size of data is illustrated. Since the sizes of video data and audio data are relatively large, for example, 600 KB and 4096 bytes, respectively, the data is transmitted/received through exclusive channels. In contrast, since the size of haptic data is relatively small as 100 bytes, and the periods of different types of haptic data are similar to each other, the transmission/reception of the haptic data may be performed through a shared channel.

Meanwhile, the transmission/reception channels may be set to the same channel or independent channels depending on the size of data.

Figure 9:
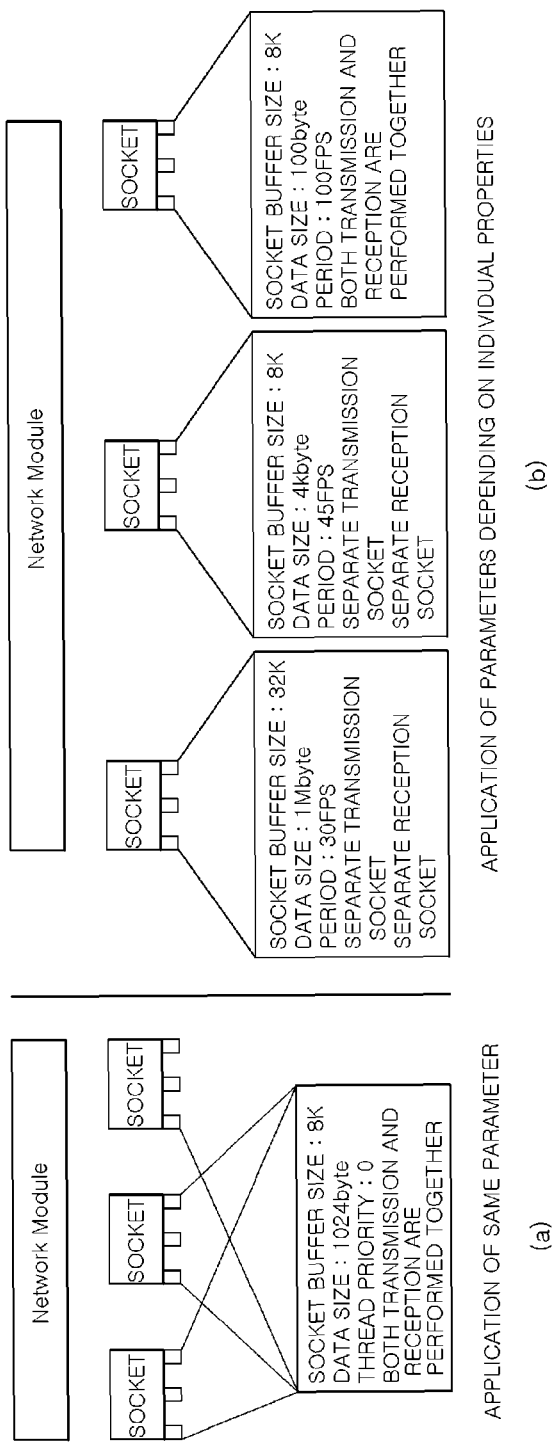
FIGS. 9A and 9B are diagrams showing examples in which transmission/reception channels are set to the same channel or independent channels depending on the size of data.

FIGS. 9A and 9B are diagrams showing examples in which transmission/reception channels are set to the same channel or independent channels depending on the size of data.

FIG. 9A illustrates the case where network parameters are uniformly set regardless of the size of transmission/reception data. In contrast, as shown in FIG. 9B, the present invention may adaptively configure the network of a specific client terminal depending on the additional determination information acquired from the specific client terminal. That is, when the size of transmission/reception data is equal to or greater than a predetermined size, the network configuration information acquisition unit 110 may acquire network configuration information that is set such that data transmission and data reception are separately performed via a transmission thread and a reception thread, respectively. In other words, a transmission socket and a reception socket may be separately configured. In contrast, when the size of transmission/reception data is less than the predetermined size, the network configuration information acquisition unit 110 may acquire network configuration information that is set such that data transmission and data reception are performed through a single thread. In other words, the transmission and reception sockets may be implemented as a single socket.

Further, the network configuration information acquisition unit 110 may acquire network configuration information that is set such that the size of a socket buffer is greater than the maximum packet size of transmission/reception data. That is, as shown in FIG. 9B, the size of the socket buffer may vary depending on the size of transmission/reception data.

When data is transmitted/received in real time, the network configuration information acquisition unit 110 may acquire network configuration information that is set such that the priority of a transmission/reception thread is set to a relatively high level and Nagle's algorithm is deactivated. Nagle's algorithm is configured to collect and transmit small pieces of data, and is advantageous in that it reduces network congestion, but is disadvantageous in real-time high-speed transmission because a delay time occurs between collecting and transmitting data. Therefore, when data is transmitted/received in real time, Nagle's algorithm may be deactivated. Nagle's algorithm is applied to the case where small-size data, such as haptic data, is transmitted at high speed, thus improving performance. Whether to apply Nagle's algorithm may be set using 'no delay option'.

Referring back to FIG. 2, the control unit 130 functions to control the flow of data between the network configuration information acquisition unit 110 and the communication unit 120. That is, the control unit 130 performs control such that the network configuration information acquisition unit 110 and the communication unit 120 perform their unique functions by controlling the flow of data between the individual components of the management server 100.

The control unit 130 includes software components of an Operating System (OS) and applications for performing specific objects, as well as hardware components such as a Micro Processing Unit (MPU), a Central Processing Unit (CPU), cache memory, and a data bus. Control commands for respective components required for the operation of the management server 100 are read from the memory in response to a system clock, and electrical signals are generated in compliance with the read control commands, and thus respective components of the hardware are operated.

Hereinafter, the configuration and operation of a management server 100' according to another embodiment of the present invention will be described in detail.

Figure 10:
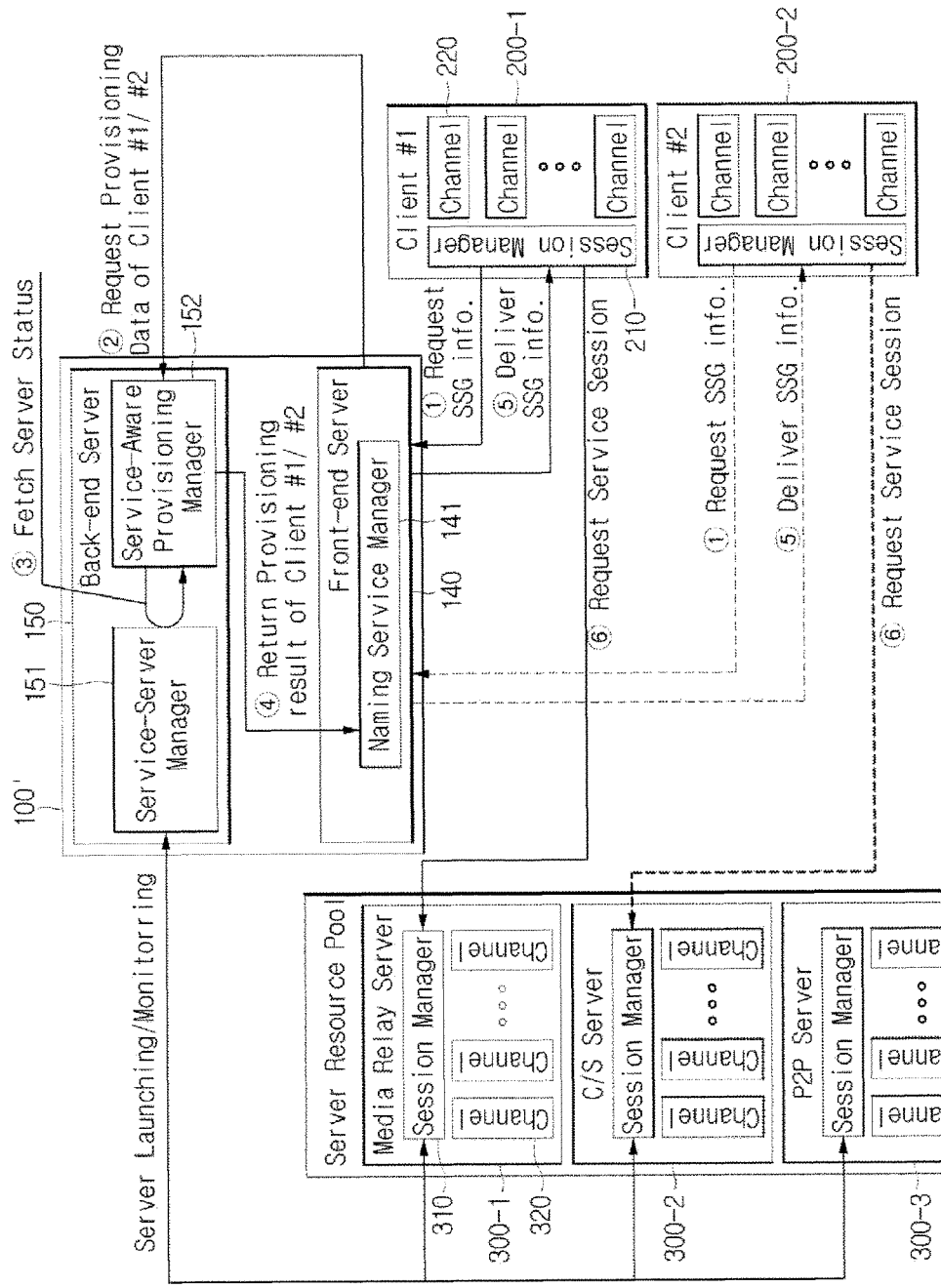
FIG. 10 is a conceptual diagram showing the configuration and operation of a management server according to another embodiment of the present invention.

FIG. 10 is a conceptual diagram showing the configuration and operation of a management server according to another embodiment of the present invention.

Referring to FIG. 10, a management server 100' according to another embodiment of the present invention may include a front-end server 140 and a back-end server 150.

The front-end server 140 may process service-provisioning requests received from client terminals 200-1 and 200-2 (only two are illustrated by way of example) while performing a naming service function, and may provide information about service session configuration (hereinafter referred to as "SSG") acquired as a result of processing by the back-end server 150 to the client terminals 200-1 and 200-2. Here, the SSG information corresponds to the above-described network configuration information (network parameter information and network topology information).

The back-end server 150 may process the requests received from the client terminals 200-1 and 200-2 and perform provisioning. More specifically, the service-aware provisioning manager 152 of the back-end server 150 may perform provisioning by simultaneously considering static provisioning configuration information, acquired from a DB (not shown), and dynamic provisioning configuration information, acquired from the client terminals 200-1 and 200-2 or a server resource pool 300. Here, the static provisioning configuration information may be network topology information, acquired from the DB 400 in the above embodiments. The dynamic provisioning configuration information means status information, service type information, data type information, etc., acquired from the server resource pool 300 composed of client terminals 200-1 and 200-2 or service provision servers 300-1, 300-2, and 300-3. The service-aware provisioning manager 152 of the back-end server 150 may acquire and provide the network topology information and the network parameter information in the above-described embodiments in consideration of the static and dynamic provisioning configuration information.

Meanwhile, the service-server manager 151 of the back-end server 150 manages and monitors the server resource pool 300 and then acquires status information. Further, when the number of users who access a specific service server reaches a maximum number, the number of servers in operation may be increased so as to allocate a new service server to a specific client terminal if a service request is received from the specific client terminal.

The server resource pool 300 may include a plurality of service provision servers 300-1, 300-2, and 300-3. In FIG. 10, a media relay server 300-1, a Centralized Service (C/S) server 300-2, and a P2P server 300-3, which provide different service properties, are exemplarily illustrated. Respective service provision servers interact with the back-end server 150 through the session manager 310, and communicate with the client terminals 200-1 and 200-2 through an established channel 320.

The client terminals 200-1 and 200-2 also interact with the front-end server 140 through the session manager 210, and communicate with the service provision servers through an established channel 220.

The overall flow of service provision will be described below.

First, the specific client terminal requests SSG information from the front-end server 140 (①). Then, the naming service manager 141 of the front-end server 140 requests the provisioning of the specific client terminal from the service-aware provisioning manager 152 (②). The service-aware provisioning manager 152 fetches server status information from the service-server manager 151 (③). The service-aware provisioning manager 152 acquires the results of provisioning in consideration of the server status information and the request (including service type information or the like) of the specific client terminal, which is provided from the naming service manager 141, and returns the results of the provisioning to the naming service manager 141 (④). Here, the results of the provisioning may include calculated information for network configuration, such as port information, IP address information, and channel information. The naming service manager 141 delivers such information as the SSG information to the specific client terminal (⑤). The specific client terminal configures a network based on the received information, and requests a service from the service provision server (⑥).

According to the present invention, the following advantages are obtained.

The present invention is advantageous in that it may rapidly and efficiently transmit/receive realistic data by adaptively modifying a network topology depending on the properties of a service desired to be received by a client terminal in a realistic data transmission/reception environment.

Further, the present invention is advantageous in that it may efficiently transmit/receive realistic data by adaptively configuring the network of a client terminal depending on the type of service desired to be received by the client terminal and the status of a service provision server.

Furthermore, the present invention is advantageous in that it may set up a network channel of a client terminal by additionally considering the type of data that is transmitted/received by the client terminal and the characteristics of an opposite terminal, thus efficiently transmitting/receiving realistic data.

The above-described embodiments of the present invention may be implemented as program instructions that can be executed by various computer means, and may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

Although the present invention have been illustrated with reference to specific details, such as detailed components, and a limited number of embodiments and drawings, those are merely provided to help the overall understanding of the present invention and are not intended to limit the present invention, and those skilled in the art to which the present invention pertains may perform various changes and modifications from the above description.

Therefore, the spirit of the present invention should not be limited to the above-described embodiments, and it should be understood that the accompanying claims and equivalents thereof are included in the spirit and scope of the present invention.

What is claimed is:

1. A method for supporting provision of a service so that a client terminal is provided with a desired service by adaptively modifying a network topology depending on properties of a service desired to be received by the client terminal, the method comprising:
    (a) when service type information indicating a type of service desired to be received by the client terminal is acquired from the client terminal, and status information indicating status of one or more service provision servers is acquired from the one or more service provision servers, acquiring, by a management server, network configuration information as information corresponding to both the service type information and the status information with reference to a database (DB), wherein the network configuration information is required by the client terminal to be provided with the service from a specific service provision server, among the one or more service provision servers; and
    (b) transmitting, by the management server, the acquired network configuration information to the client terminal, thus supporting network configuration such that the client terminal configures a network based on the network configuration information.

2. The method of claim 1, wherein (a) comprises:
    (a1) when service type information indicating a type of service desired to be received by the client terminal is acquired from the client terminal, and first status information indicating status of the one or more service provision servers is acquired from the one or more service provision servers, acquiring, by the management server, network topology information corresponding to both the service type information and the first status information with reference to the DB; and
    (a2) determining, by the management server, network parameter information based on the acquired network topology information and second status information indicating status of the one or more service provision servers, wherein the network parameter information is required by the client terminal to be provided with the service from a specific service provision server, among the one or more service provision servers.

3. The method of claim 2, wherein each of the first status information and the second status information includes at least a part of information about a number of service provision servers that currently provide a service, information about a number of users who are currently provided with a service from the one or more service provision servers, and information about a number of channels through which the service is currently provided.

4. The method of claim 1, wherein (a) is configured such that:
    when the service type information indicating a type of service desired to be received by the client terminal is acquired from the client terminal, and status information indicating status of the one or more service provision servers is acquired from the one or more service provision servers,
    the management server acquires (i) network topology information and (ii) network parameter information, which correspond to both the service type information and the status information, with reference to the DB.

5. The method of claim 1, wherein (a) is configured such that:
    when the status information includes information about a number of users who are currently provided with a specific service from a specific service provision server, and the number of users is identical to a maximum number of users of the specific service provision server that provides the specific service, the management server acquires network configuration information required by the client terminal to be provided with the specific service from a new service provision server.

6. The method of claim 1, wherein (a) is configured such that:
when at least one of information about a type of transmission/reception data, which is transmitted/received when the client terminal is provided with a service, and information about a number of opposite terminals that transmit/receive data to/from the client terminal, is additionally acquired from the client terminal,
the management server acquires information about a number of data transmission/reception channels corresponding to at least one of the type information of the transmission/reception data and the information the number of opposite terminals, as the network configuration information.

7. The method of claim 6, wherein, when the transmission/reception data is at least one of video data and audio data, each of the video data and the audio data is allocated to an independent channel.

8. The method of claim 1, wherein:
when the service type information indicates a streaming service, the management server is configured to acquire network configuration information required to be provided with the streaming service through a specific relay server, among the one or more service provision servers, with reference to the DB,
when the service type information indicates a 1:1 communication service, the management server is configured to acquire network configuration information required to be provided with the 1:1 communication service through a specific P2P server, among the one or more service provision servers, with reference to the DB, and
when the service type information indicates a data processing service, the management server acquires network configuration information required to be provided with the data processing service through a specific physical engine server, among the one or more service provision servers, with reference to the DB.

9. The method of claim 1, wherein, when at least a part of specification information of the client terminal, transmission/reception period information of data, size information of the transmission/reception data, and size information of a maximum packet of the transmission/reception data is additionally acquired as additional determination information from the client terminal, the management server acquires the network configuration information by additionally considering at least a part of the specification information of the client terminal, the transmission/reception period information of data, the size information of the transmission/reception data, and the size information of the maximum packet of the transmission/reception data.

10. The method of claim 9, wherein:
when the size of the transmission/reception data is equal to or greater than a predetermined size, network configuration information that is set such that data is transmitted/received through an exclusive channel is acquired, and
when the size of the transmission/reception data and a size of other pieces of transmission/reception data are less than a predetermined size and periods thereof are similar to each other, network configuration information that is set such that the transmission/reception data and the other pieces of transmission/reception data are transmitted/received through a shared channel is acquired.

11. The method of claim 9, wherein:
when the size of the transmission/reception data is equal to or greater than a predetermined size, network configuration information that is set such that data transmission and data reception are separately performed through a transmission thread and a reception thread is acquired, and
when the size of the transmission/reception data is less than the predetermined size, network configuration information that is set such that data transmission and data reception are performed through a single thread is acquired.

12. The method of claim 9, wherein, when a size of a socket buffer is set to be greater than the size of the maximum packet of the transmission/reception data, and the data is transmitted/received in real time, network configuration information that is set such that priority of a transmission/reception thread is set to a relatively high level and Nagle's algorithm is deactivated is acquired.

13. The method of claim 1, wherein the management server further performs a typical naming service function.

* * * * *